Feb. 21, 1967 TAKEWO CHIKU ETAL 3,304,787
THREE-DIMENSIONAL ACCELEROMETER DEVICE
Filed Dec. 6, 1963 6 Sheets-Sheet 1

ANGLE BETWEEN DIRECTION OF VIBRATION AND LONGITUDINAL AXIS OF ELEMENT

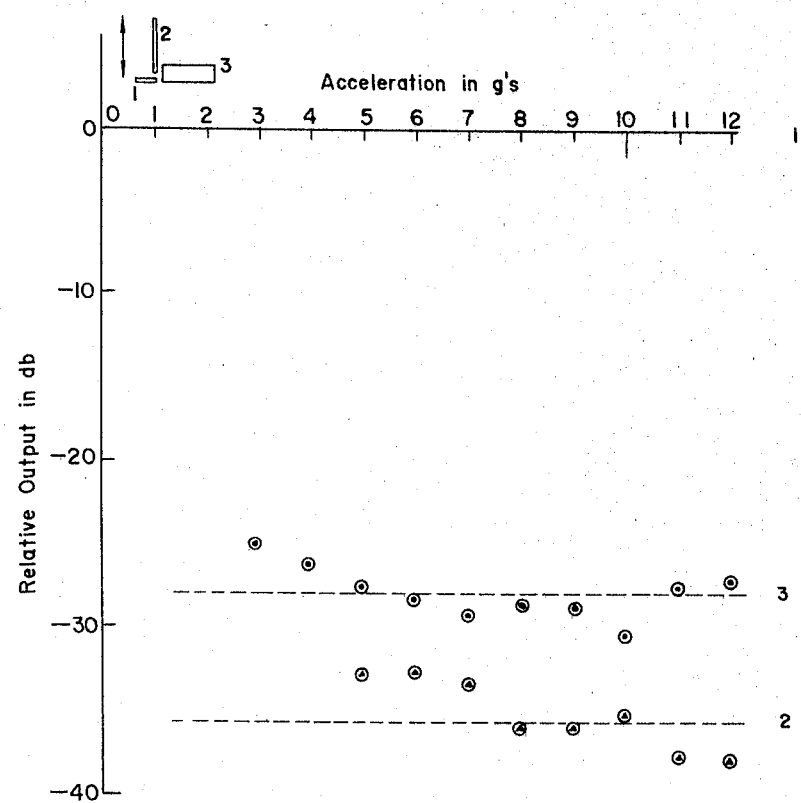

{ # United States Patent Office 3,304,787
Patented Feb. 21, 1967

3,304,787
THREE-DIMENSIONAL ACCELEROMETER DEVICE
Takewo Chiku, Nishikamo-gun, Aichi, and Isemi Igarashi, Nagoya, Aichi, Japan, assignors to Kabushiki Kaisha Toyota Chuo Kenkyusho, Nagoya, Japan
Filed Dec. 6, 1963, Ser. No. 328,703
Claims priority, application Japan, Dec. 29, 1962, 37/59,797
8 Claims. (Cl. 73—517)

This invention relates generally to an accelerometer device and more particularly to a plural-dimensional accelerometer device utilizing elements of piezoresistive material.

Heretofore, a wide variety of accelerometers have been proposed for determining an acceleration or a deceleration of a certain portion of a moving object only in one direction. Also there have been previously proposed various three-dimensional accelerometers. However, such accelerometers each are required to include more than three measuring elements and are disadvantageous in that its performances are affected by its volume and weight and that a manner in which the measuring elements are mounted on an object to be measured should be most satisfactorily correlated with respective directions in which the associated elements detect components of an acceleration or deceleration of the object.

Therefore, a general object of the invention is to provide a novel and improved three-dimensional accelerometer device for simultaneously measuring three components of an acceleration or deceleration of a moving object in three orthogonal directions as to that portion thereof where a minimum number of measuring elements are mounted and in which the aforesaid disadvantages are substantially eliminated.

Further there have already been known accelerometer devices utilizing piezoresistive materials although the plural dimensional type are relatively few. For example, such devices are disclosed and claimed in U.S. Patent No. 2,963,911 entitled "Piezoresistive Accelerometer" to J. S. Courtney-Pratt et al. and U.S. Patent No. 3,023,627 entitled "Strain Gauge and Accelerometer" to F. T. Geling.

According to U.S. Patent No. 2,963,911 a sensory mass is fixed at its center to an object to be measured through six leg members in three directions orthogonal to each other. Each of the leg members is formed of an elongated member cut from a single crystal of piezoresistive material and arranged to be subject to a tension and/or a compression in the associated direction to sensitively change in electric resistance with a pair of aligned leg members being in similar character. However, the manufacturing of such a device has encountered difficulties in that (1) The six leg members should be substantially identical with one another in mechanical and electrical characteristics;
(2) The leg members should be maintained in relative position;
(3) Increase in sensitivity of the device leads to decrease in strength thereof; and
(4) The device is impossible to be controlled in sensitivity in each direction once the same has been assembled.

An arrangement according to U.S. Patent No. 3,023,627 is of construction comprising a plurality of arm members including a multiplicity of components made of a piezoresistive material and disposed in a common axis. The arrangement is relatively simple in constructure and can use a bridge circuit for measurement. It, however, is disadvantageous in that (1) The arrangement provides only a low output; and (2) Accelerations or decelerations in plural directions are not only difficult to be measured but also the measurement, if possible, are effected with large error.

Accordingly, a general object of the invention is to provide a novel and improved three-dimensional accelerometer device having a unitary structure in which three measuring elements are disposed perpendicularly to each other and secured at one end to a common support member, the longitudinal axes of the measuring elements or the longer edges thereof intersecting each other at a common point, the support member being adapted to be mounted to a moving body to be measured such that the common point either coincides with a point on or within the moving body, or is positioned adjacent the last mentioned point whereby an acceleration or a deceleration exerted on or adjacent the common intersection point can be measured in magnitude and direction.

Another object of the invention is to provide a novel and improved three-dimensional accelerometer device comprising three piezoresistive measuring elements disposed in the manner as described in the preceding paragraph and means for converting the kinetic energies applied to the measuring elements into electrical signals by which an acceleration or deceleration exerting upon or adjacent the aforesaid intersection point can be very precisely determined through the use of simple equations.

A further object of the invention is to provide a novel and improved three-dimensional accelerometer device comprising three measuring elements disposed in the manner as described in the preceding paragraph wherein a point at which an acceleration or a deceleration is to be measured is close to the aforesaid intersection point such that any error in measurement due to a distance between these two points is substantially negligible.

A still further object of the invention is to provide a novel and improved three-dimensional accelerometer device comprising a support member to which three measuring elements are secured in the form of a right trigonal pyramid or a cube which is small, easy to manufacture and which has a high degree of accuracy.

Another object of the invention is to provide a small sized three-dimensional accelerometer device having a high degree of accuracy and a monolithic structure prepared from a single body of monocrystalline piezoresistive material so as to comprise three measuring elements disposed in the manner described in the preceding paragraph.

With the aforesaid objects in view, the invention resides in a three-dimensional accelerometer device comprising a triad of thin, relatively small piezoresistive elements of elongated rectangular shape extending respectively in three directions orthogonal to each other and secured at one end to a common support member to form a unitary structure with the main faces of the elements perpendicular to each other and either with the longitudinal axes of the elements passing substantially through a common point near to the fixed ends of the elements or with long edge of each element intersecting the corresponding long edges of the other elements at a common point. With the device mounted to a moving object to be measured, each of the piezoresistive elements is adapted to be bent in the direction normal to its main face in accordance with a magnitude of a component of any applied acceleration in that direction to produce a strain therein to thereby change its electric resistance. A Wheatstone bridge circuitry associated with the triad of piezoresistive elements may determine this change in resistance for each element to provide three separate electrical signals proportional respectively to the changes in resistance of the elements and hence to the components of the acceleration applied to the elements respectively. The signals thus obtained are utilized to obtain the acceleration applied to the vicinity of that portion of the object to which the device is mounted.

Alternatively, the accelerometer device of the invention may advantageously comprise a triad of elongated rectangular members of any suitable resilient material extending respectively in three directions orthogonal to each other and secured at one end to a common support member to form a unitary structure with the main faces of the members perpendicular to each other and with the longitudinal axes of the members passing substantially through a common point near to the fixed ends of the members or with one long edge of each member intersecting the corresponding long edges of the other members at a common point, and at least one thin, relatively small piezoresistive element of elongated rectangular shape attached on either or both of the main faces of each of members adjacent the fixed end with the longitudinal axis of the element disposed along or in parallel to that of the member.

The invention as of its organization as well as the manners of operation and practice and other objects thereof will become more readily apparent from the following detailed description in conjunction with the accompanying drawings in which.

Figure 5A:
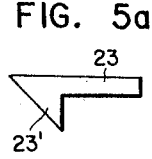
FIG. 5a shows a diagrammatic view of a piezoresistive element-bearing member which may be used with the device illustrated in FIG. 1.
Figure 5B:
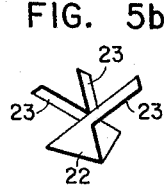
FIG. 5b shows a perspective view illustrating the manner in which three bearing members shown in FIG. 5a are mounted to a common mounting of right trigonal pyramid shape.
Figure 5C:
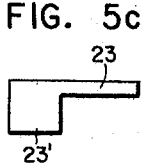
Figure 5D:
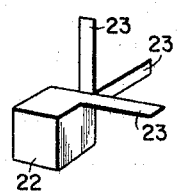
Figure 5E:
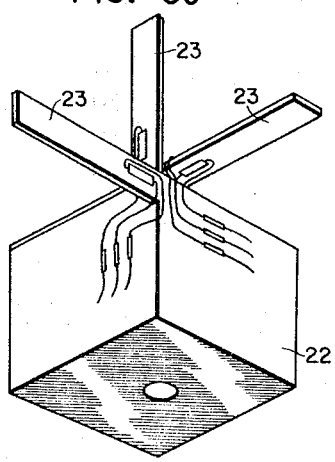

FIGS. 5c and d show views similar to FIGS. 5a and b respectively but illustrating the case a common mounting is of cubic shape;

FIG. 5e shows a perspective view of a device using the components illustrated in FIGS. 5c and d.

Figure 3:
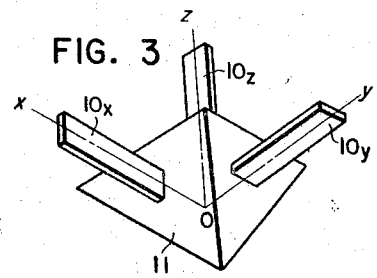
FIG. 3 shows a perspective view of an accelerometer device constructed in accordance with the teachings of the invention.
Figure 9:
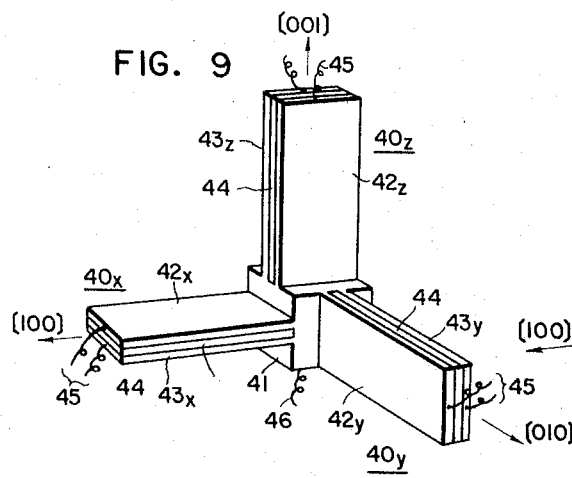
Figure 10:
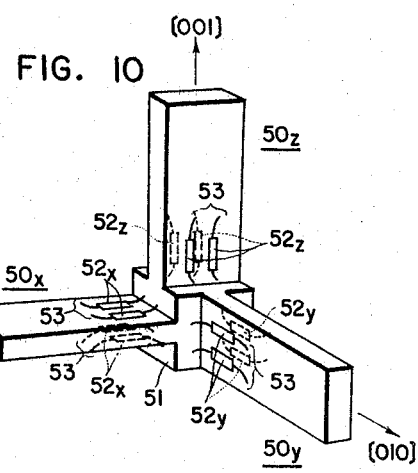
Figure 11A:
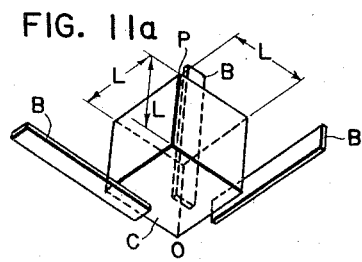
Figure 11B:
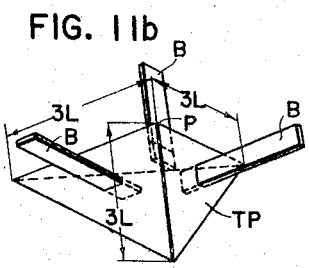
Figure 11C:
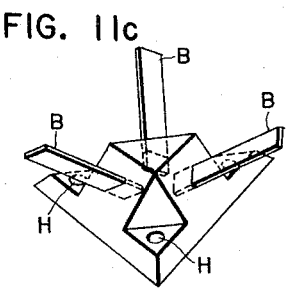
Figure 6:
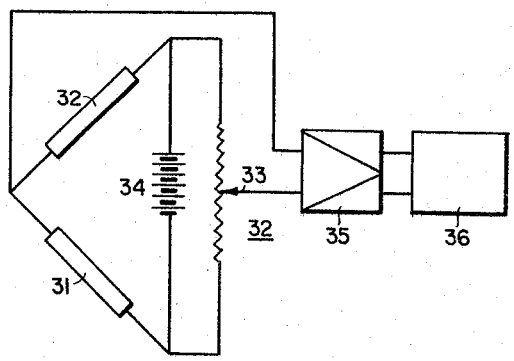
Figure 7:
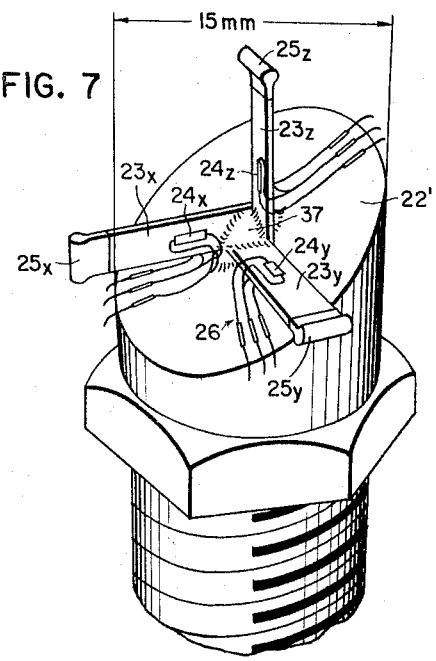
Figure 8:
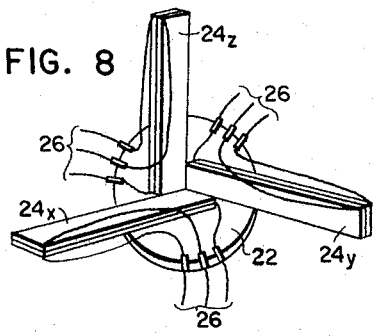

FIG. 6 shows a schematic diagram of a measuring electric circuitry suitable for use with an accelerometer device according to the invention;

FIG. 7 shows a perspective view of one form of the present device using a mounting on a bolt's head;

FIG. 8 shows a perspective view of a modification of the invention including three piezoresistive elements secured to a common mounting in a manner different from that illustrated in FIG. 3;

FIG. 9 shows a perspective view of another modification of the invention including three piezoresistive elements machined from a single monocrystalline body of piezoresistive material;

FIG. 10 shows a perspective view of a further modification of the invention including three piezoresistive element-bearing members machined from a single monocrystalline body of a semiconductor material and piezoresistive elements disposed on the associated members by epitaxial growth or diffusion technique;

FIGS. 11a through c show in perspective a different manner in which the device illustrated in FIG. 3 may be assembled.

Figure 14:
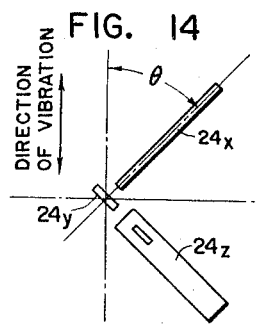
Figure 15:
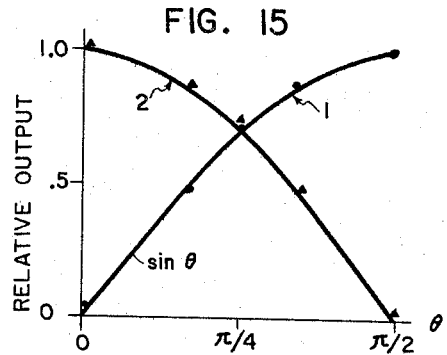
Figure 12:
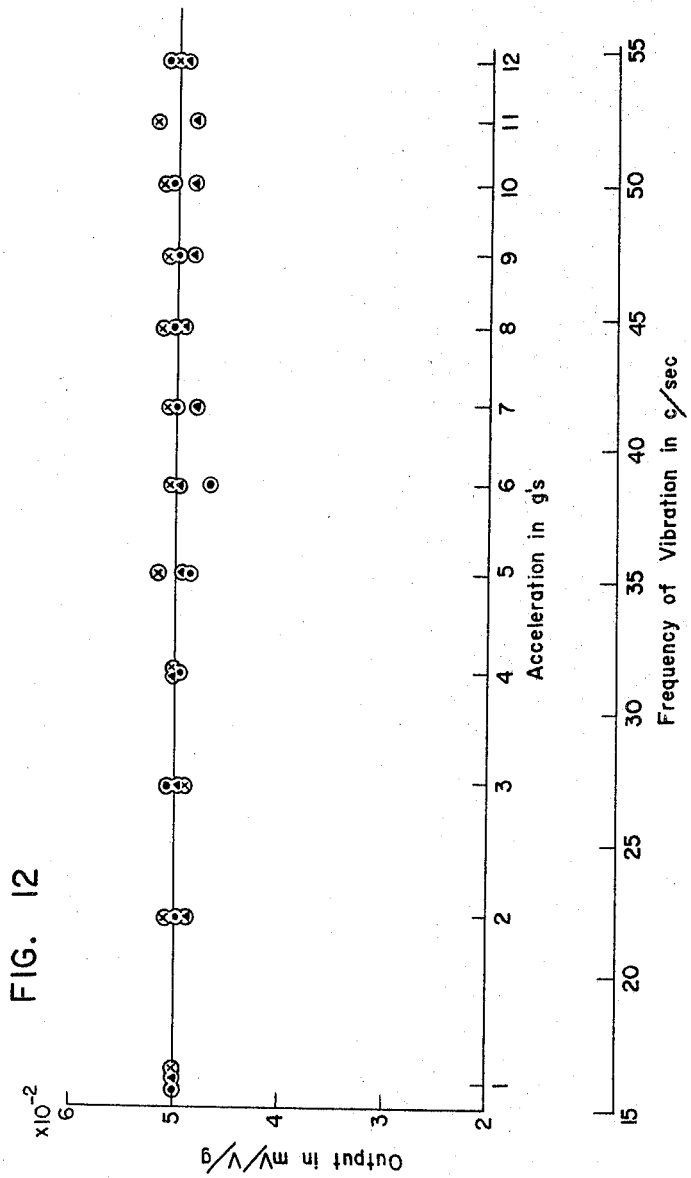
Figure 13:
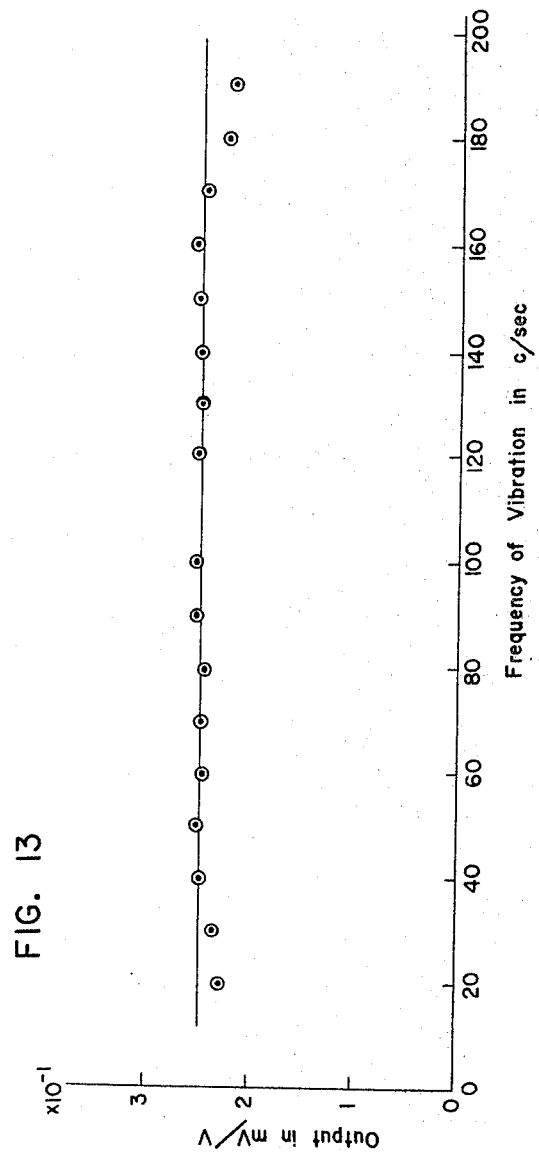

FIG. 12 shows a graph plotting an output from the present device against an acceleration applied thereto;

FIG. 13 shows a graph illustrating the frequency response of an accelerometer device according to the invention;

FIG. 14 shows a diagram useful for explaining the operation of the invention;

FIG. 15 shows a graph illustrating the relationship between relative output from the arrangement shown in FIG. 14 and direction of acceleration applied thereto; and FIG. 16 shows a graph illustrating the anisotropic characteristics of an accelerometer device according to the invention.

Figure 1:
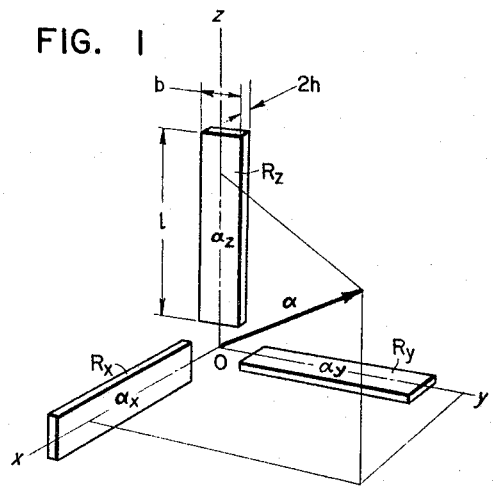
FIG. 1 shows a perspective view useful for explaining the principle of the invention.

Referring now to FIG. 1 of the drawings, there is illustrated an arrangement useful for explaining the principle of the invention. The arrangement illustrated includes a triad of rectangularly shaped resilient elements $R_x$, $R_y$ and $R_z$ disposed along the $x$, $y$ and $z$ axes of a system of rectangular coordinates respectively with each element having its longitudinal axis coinciding with the associated coordinate axis and having the main face perpendicular to the main faces of the other elements. For example, the element $R_x$ is disposed along the $x$ axis with its longitudinal axis coinciding with the $x$ axis and with its opposite main faces perpendicular to both the opposite main faces of the element $R_y$ and the opposite main faces of the element $R_z$. It is assumed that each element has a thickness of $2h$, a width of $b$, and a length of $l$ and that only the adjacent ends of the elements are suitably fixed adjacent the origin O of the system of coordinates or the common intersection of the longitudinal axes of the respective elements for bending movement in the direction normal to the associated main face.

Under these circumstances, when an acceleration designated by thick solid line $\alpha$ in FIG. 1 exerts on the origin O the respective elements as cantilever beams disposed respectively along the $x$, $y$ and $z$ axes the elements will be imparted the corresponding kinetic energies to be bent. Thus the free end of each element is displaced in accordance with the energy applied. Assuming that $d$ represents this displacement and that each element has a sensitivity for the applied acceleration of $1/n^2$, one of the elements, for example, the element $R_z$ extending in the direction of the $z$ axis and having the main face perpendicular to the $x$ axis has a displacement in the direction of the $x$ axis of $d_x$ expressed by the equation $$d_x = (1/n^2)\alpha_x \quad (1)$$

due to the $x$ component of acceleration $\alpha_x$ and a displacement in the direction of the $y$ axis of $d_y$ expressed by the equation $$d_y = (1/n^2)\alpha_y \quad (2)$$

due to the $y$ component of acceleration $\alpha_y$.

Further for purpose of simplicity assuming that the total mass of the element is located a distance from the fixed end of $l$, the $x$ component of acceleration $\alpha_x$ causes displacement $d_x$ of the free end equal to $$d_x = M\alpha_x l^3 / 3EI_y \quad (3)$$

where $M$ = total mass
$E$ = young's modulus of element
$I_y$ = moment of inertia of element in the ZX plane.

Therefore, from the Equations 1 and 3 the sensitivity $(1/n^2)_x$ in the $x$ direction of the element is $$(1/n^2)_x = Ml^3/3EI_y \quad (4)$$

Similarly the element has the sensitivity $(1/n^2)$ in the $y$ direction represented by $$(1/n^2) = Ml^3/3EI_x \quad (5)$$

where $I_x$ = moment of inertia of element in the YZ plane.

Assuming the width $b$ of the element is sufficiently larger than the thickness $2h$ or $b \gg 2h$, $$(1/n^2)_x \gg (1/n^2)_y \quad (6)$$

Therefore, it can be considered that the element $R_z$ extending in the direction of the $z$ axis is principally bent by having the $x$ component of acceleration $\alpha_x$ applied thereto. Similarly, the elements $R_y$ and $R_x$ will be principally bent by having the z and y components of acceleration $\alpha_z$ and $\alpha_y$ applied thereto respectively.

Thus the system of the triad of orthogonal elements $R_x$, $R_y$, $R_z$ will effect movement resulting from the three components of the acceleration exerting on the orthocenter of the system.

According to the invention, a semiconductor material exhibiting the piezoresistive effect is utilized in the form of an elongated rectangle to convert a kinetic energy due to an applied acceleration into change in electric resistance which, in turn is converted into an electric signal by any suitable electric circuit.

Figure 2:
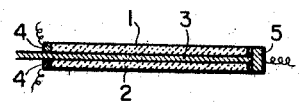
FIG. 2 shows a longitudinal sectional view of a piezoresistive element suitable for use with the invention.

FIG. 2 shows a piezoresistive element for serving to convert the aforesaid kinetic energy into the electrical signal. The element includes a pair of rectangular thin wafers of any suitable semiconductor material 1 and 2 joined to each other by a thin layer of any suitable electrically insulating adhesive 3 such as an epoxy resin, a pair of electrodes 4 disposed in ohmic contact with the wafers at one end and a common electrode 5 connected to the other ends of the wafers. It is to be understood that the pair of wafers are substantially similar to each other in shape and mechanical and electric properties.

Suitable examples of the semiconductor materials involve silicon, germanium, and compounds comprising stoichiometric proportions of an element from Group III of the Periodic Table and more particularly aluminum, gallium and indium combined with an element from Group V of the Periodic Table and more particularly phosphorous, arsenic and antimony. Also stoichiometric compounds of Group II and Group VI elements for example, zinc selenide and zinc sulfide may be used.

In order to dispose three piezoresistive elements just described in the manner as illustrated in FIG. 1, a right trigonal pyramid may be advantageously used as a common support member therefor. A right trigonal pyramid includes three edges intersecting perpendicularly to each other at a common vertex. Therefore, if, as shown in FIG. 3, three piezoresistive elements 10x, 10y and 10z are secured to a right trigonal pyramid 11 as a common mounting such that they are planted perpendicularly in the side planes of right isosceles triangle at their centers of gravity with the longitudinal axes thereof passing through the associated centers of gravity respectively then the same axes will extend in the x, y and z directions orthogonal to each other and intersect perpendicularly to each other at a center of gravity O of a plane of regular triangle forming the bottom of the pyramid. It is to be noted that the sides of the elements are disposed in parallel to the associated edges of the pyramid.

If it is desired to measure an acceleration or a deceleration at a given point the device as illustrated in FIG. 3 is rigidly secured to that point with the point O on the support member coinciding with the point to be measured. This expedient ensures that an acceleration of a deceleration at a given point is precisely measured without any error in measurement due to the fact that the given point and the point O are spaced from each other. Also, in order to measure an acceleration or a deceleration at a point within a moving body, the bottom side of the pyramid shown in FIG. 3 may be cut away while the cut surface is always maintained parallel to the original bottom surface until the intersection point O coincides with the given point when the device is secured to the moving body.

Each of the piezoresistive element pairs has one end fixed and the other end free to provide a cantilever beam. Thus a component of an acceleration exerting on the element pair in the direction normal to its main face causes a compressive stress and a tensile stress within the pair of elements respectively whose magnitudes are equal to each other to thereby greatly vary the electric resistance of the elements. This variation in electric resistance may be measured by any suitable electric circuitry such as a Wheatstone bridge as will be described hereinafter.

As previously pointed out, each of the piezoresistive elements 10x, 10y and 10z responds mainly to a component of an acceleration acting thereto in the direction normal to its main face. Therefore, the three orthogonal components of the acceleration applied can be measured in this way and the resultant thereof determines the magnitude and direction of the acceleration.

It has been found that the longitudinal axes of three piezoresistive elements perpendicular to each other may pass through the vicinity of a point near to the fixed ends thereof with the very satisfactory results. For example, a triad of piezoresistive elements may be disposed such that one side of each element parallel to the longitudinal axis or a line positioned in parallel to and a predetermined distance from the longitudinal axis intersect the corresponding sides or lines of the other elements at a common point. Also it has been found that, without adversely affecting the performance of the finished device, a point of intersection such as above described may be positioned in the interior of a common support member such as the mounting 11 shown in FIG. 3 under certain conditions which will be subsequently described.

The measures as above described facilitates the construction of the present devices as will be apparent hereinafter.

Referring back to FIG. 1, the elements or cantilever beams $R_x$, $R_y$ and $R_z$ are assumed to have a uniform density of $\rho$. Also it is assumed that for purpose of simplicity only one of the beams, for example, the beam $R_z$ has an acceleration $A(s)$ which is a function of a longitudinal distance $s$ from the fixed end thereof, at every point on the main face thereof normal to the same. Under the assumed conditions, the element can be bent only in the direction normal to the main face thereof and a strain $\epsilon$ produced at the fixed end is expressed by the equation $$\epsilon = k \cdot 2hb \int_0^l sA(s)ds \qquad (7)$$

where $k$ is a constant. As well known, k is expressed by the equation $$K = \frac{h}{EI} = \frac{h}{E} \frac{1}{\frac{2}{3}bh^3} = \frac{3}{2} \frac{1}{bh^2 E}$$

where $E=$Young's modulus of beam
$I=$moment of inertia of beam.

If it is asumed that the total mass of the beam of $2hbl\rho$ is concentrated at a point on the beam the coordinate of which is $l_0 \leq l$ then the strain $\epsilon$ as just described is equal to $k \cdot 2hbl\rho A(l_0)_0$. Assuming that this strain is equal to the strain expressed by the Equation 7, the coordinate of that point at which the total mass of the beam is concentrated is expressed by the equation $$l_o = \frac{1}{lA(l_o)} \int_0^l A(s)ds$$

Thus a mathematical analysis may proceed in terms of a cantilever beam having its total mass lumped at a point whose coordinate is $s=l_o$.

Similarly, if the cantilever beam includes a sensory mass of $m_0$ at its free end or a point expressed by $s=l$, then the same may be mathematically analysed as having the total mass of the beam itself plus the sensory mass at a point on the same whose coordinate is expressed by the equation $$l_o = \frac{2hb\rho}{(2hbl\rho + m_o)A(l_o)} \left\{ \frac{m_o lA(l)}{2hb\rho} + \int_0^l sA(s)ds \right\}$$

under an assumed condition that the length portion of the beam along which the sensory mass is attached is negligible as compared with the total length of the beam.

In order to discuss an acceleration exerting on a triad of orthogonal cantilever beams it can generally be assumed that each beam has a sensory mass of $m$ to respond to the acceleration applied to the same, at a point represented by a position vector $\vec{r}_m$ beginning from the intersection of the respective longitudinal axes of the three beams.

It is also assumed that an acceleration vector $\vec{A}_m$ denotes an acceleration applied to the sensory mass, the respective longitudinal axes of three orthogonal cantilever beams intersect at a point P which, in turn, is assumed on a surface of an object to be measured, and that the object is rotating about an axis passing through its center of gravity G. Further, it is assumed that, by using a system of three-dimensional rectangular coordinates having its origin at the center of gravity G of the object, $\vec{r}_p$ designates a position vector extending from the center of gravity G to the point P, $\vec{A}_G$ a vector for an acceleration acting on the center of gravity G, $\omega$ designates a vectorial angular velocity of the object about its center of gravity. Then the acceleration $\vec{A}_m$ exerting on the mass $m$ is expressed by the vectorial equation $$\vec{A}_m = \vec{A}_G + \dot{\vec{\omega}} \times (\vec{r}_p + \vec{r}_m) + \vec{\omega} \times \{\vec{\omega} \times (\vec{r}_p + \vec{r}_m)\} \quad (8)$$

Where $\vec{r}_p$ and $\vec{r}_m$ are assumed to be constant.

On the other hand, the acceleration $\vec{A}_P$ at the point P is expressed by the vectorial equation $$\vec{A}_P = \vec{A}_G + \dot{\vec{\omega}} \times \vec{r}_p + \vec{\omega} \times \vec{\omega} \times \vec{r}_p \quad (9)$$

Vectorial substraction of the Equation 8 from the equation $$|\vec{A}_P - \vec{A}_m| = |\dot{\vec{\omega}} \times \vec{r}_m + \vec{\omega} \times \vec{\omega} \times \vec{r}_m|$$
or
$$|\vec{A}_P - \vec{A}_m| \leq (\dot{\omega} + \omega^2)|\vec{r}_m| \quad (10)$$

This expression is always held regardless of the magnitudes of $\dot{\omega}$ and $\omega$. It is assumed that $|\vec{r}_m| = l$. As will be readily appreciated from the above expression (9), if the length $l$ of the beam is small and if $(\dot{\omega}+\omega)l$ is small sufficiently as compared with $|\vec{A}_P|$ then the acceleration $\vec{A}_m$ will be substantially equal to the acceleration $\vec{A}_P$ at the point P. Thus it will be apparent that three components of an acceleration detected by the beams extending along the $x$, $y$ and $z$ axes respectively can be regarded as three components of the acceleration at the point P. Obviously, the smaller the length of each cantilever beam the more readily the condition just described will be satisfied.

According to the invention one rectangular wafer of any suitable piezoresistive material such as germanium or silicon is attached to each of the three cantilever beams disposed adjacent its fixed end in the manner as above described. When the triad of beams bearing the respective piezoresistive wafers has an acceleration applied thereto strains occur in the beams adjacent the fixed ends in the manner as previously described to change the resistances of the associated piezoresistive wafers. This change in resistance can be measured by any suitable means.

Figure 4:
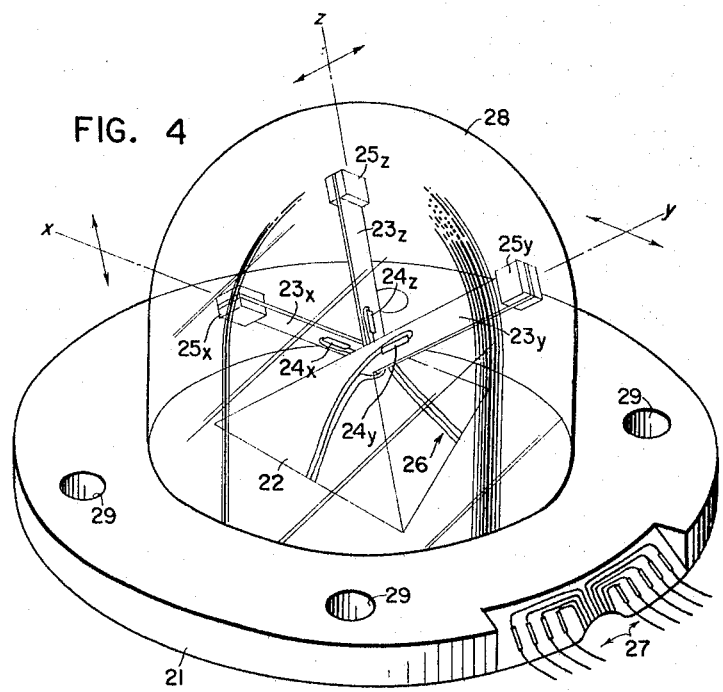
FIG. 4 shows a perspective view of another device constructed in accordance with the teachings of the invention.

Referring now to FIG. 4 of the drawings, there is illustrated a three-dimensional accelerator device according to the teachings of the invention. The device illustrated comprises a relatively thin base disk 21 of any suitable material such as aluminum, a common mounting 22 of any suitable metallic material such as carbon steel in the form of a right trigonal pyramid rigidly secured to the disk 21 on the central portion and three cantilever beam members 23x, 23y and 23z of any suitable resilient material such as a low carbon steel or a spring steel in the form of an elongated rectangular thin wafer secured at one end portion on three side planes of a right regular triangle of the pyramid 22 by any suitable means in such a manner that one long side of each beam member aligns with or provides an extension of one of both edges forming the associated side plane of the pyramid. To this end, each of the cantilever beams members 23 may conveniently include, one end portion 23' corresponding in shape and area to that side surface of the pyramid 22 on which the beam member is subsequently attached as shown in FIG. 5a. Then the cantilever beams 23 may be attached to the pyrimid 22 with the end portions 23' disposed in registry with the associated surfaces of the latter. Thus each beam has its main face providing an extension of the associated surface of the pyramid.

From the geometry of a right trigonal pyramid it will be appreciated that the triad of cantilever beam members 23x, 23y and 23z secured to the common support member in the manner as above described extend respectively in three orthogonal directions $x$, $y$ and $z$ in which the respective edges forming the side planes of the pyramid are disposed with one long edge of each member intersecting the corresponding edges of the remaining members at the apex of the pyramid and with the main faces of the beam members perpendicular to each other. In other words, the longitudinal axes of the cantilever beam members pass through the vicinity of a point within the pyramid.

It is to be noted that the beam members should be thin enough to be sensitively bent lengthwise upon applying accelerations or decelerations to the same in directions perpendicular respectively to the $x$, $y$ and $z$ directions or in the directions of the arrows designated crossing respectively the $x$, $y$ and $z$ directions in FIG. 4. Also it is to be noted that, as previously pointed out, the beam members should be small in length. The device further comprises a pair of piezoresistive elements 24x, 24y and 24z of any suitable piezoresistive material such as semiconductive germanium or silicon in the form of a thin wafer much smaller than the member 3, affixed to the opposite main faces of each cantilever beam member 23x, 23y or 23z adjacent the fixed end portion in opposite relationship with the longitudinal axis of each element substantially coinciding with that of the associated beam member. Although one piezoresistive element would be provided for each beam member, the provision of the pair of piezoresistive elements on each wafer is advantageous in that the device is substantially insensible to any variation in temperature of the surroundings. With n type silicon used, the piezoresistive element may have preferably the longitudinal axis in a [100] crystallographic direction of a single crystal of piezoresistive material used because the element has its maximum sensitivity in that direction.

The device also comprises a sensory block 25x, 25y or 25z secured to each of the cantilever beam members 23x, 23y or 23z at the free end in order to increase the sensitivity of the device. If desired, the sensory block may be omitted. A pair of leads 26 are connected at one end to each pair of the opposed piezoresistive elements 24x, 24y or 24z and connected at the other end to a pair of output conductors 27 respectively. A bell jar 28 of glass is disposed on the base disk 21 to enclose the assembly 22–26 for the purpose of preventing the same from being contaminated with external dusts. The base plate 21 includes formed on the peripheral portion a plurality of mounting holes 29 to facilitate mounting of the device on an object to be measured.

From the foregoing, it will be appreciated that the device is assembled in a unitary structure including three resilient cantilever wafer beam members 23x, 23y and 23z with respective piezoresistive beam members 24x, 24y and 24z extending respectively in the $x$, $y$ and $z$ directions orthogonal to each other with each of the elements having its opposite main faces disposed perpendicularly to those of the other elements. In other words, the beam member 23z and hence the piezoresistive element 24z extending in the z direction has the opposite main faces disposed at right angles to the y axis while the other members and associated elements extending respectively in the x and y directions have the respective main faces disposed at right angles to the z and x axes respectively.

The device thus far described is operated as follows: It is assumed that the device has been rigidly secured to that portion of an object (not shown) on which an acceleration or a deceleration is to be measured by the utilization of the holes 29 or any other suitable means. Under the assumed conditions, when the device has been subject to an acceleration or a deceleration in any direction each of the resilient cantilever beam members 23x, 23y and 23z effects a longitudinal bending whose magnitude is proportional to that component of the acceleration or deceleration resolved in the associated direction x, y or z. This longitudinal bending of the beam member causes in the associated piezoresistive element a strain proportional to the same to correspondingly vary the electric resistance of the element according to the mechanism well known now to those skilled in the art. This variation in electric resistance may be determined by any suitable means such as a measuring electric circuitry illustrated in FIG. 6 of the drawings.

Referring to FIG. 6, there is illustrated a measuring electric circuitry suitable for use with the accelerometer devices as previously described in conjunction with FIGS. 3 and 4. It is, however, to be understood that the circuitry illustrated is provided for each pair of opposed piezoresistive elements such as 10x (FIG. 3) or 24x (FIG. 4) associated with the particular cantilever beam member such as 23x (FIG. 4) and that the circuitry may be effectively used with various modifications of the invention as will be described hereinafter.

As shown in FIG. 6, a pair of piezoresistive elements 30 and 31 such as previously described the semiconductor wafers 1 and 2 shown in FIG. 2 or the pair of opposed piezoresistive elements 24x, 24y or 24z described in FIG. 4 are disposed in a pair of adjacent arms of a Wheatstone bridge circuit respectively while a potentiometer 32 including an adjustable slide 33 forms the two remaining arms of the bridge. A suitable source of direct current 34 is connected between the junction of the piezoresistive element 30 and one portion of the potentiometer 32 and the junction of the piezoresistive element 31 and the other portion of the potentiometer. A pair of the output terminals of the Wheatstone bridge circuit or the junction of the pair of piezoresistive elements 30 and 31 and the slide 33 are connected to an input to an amplifier circuit 35 which, in turn, is connected to a recorder 36. With the accelerometer device maintained stationary, the slide 33 on the potentiometer 32 is controlled to balance the Wheatstone bridge. Then variation in resistance of the elements 30 and 31 due to an acceleration applied thereto provides an output of electrical signal from the bridge which is proportional to the acceleration. This signal is amplified by the amplifier circuit 35 and then recorded on the recorder 36. In this way, the three components of the acceleration applied will be separately recorded on three recorders.

In order to assemble a triad of cantilever beams in a unitary structure such as previously described, a cubic body of metallic material may be equally used as a common mounting or support member as shown in FIG. 5e. A thin beam 23 shown in FIG. 5c includes one end portion 23' corresponding in shape and area to that face of a cubic body 22 on which the one end portion of the beam is subsequently attached. As shown in FIG. 5d, three of such beams may be attached to the cubic body 22 in the similar manner as above described in conjunction with FIGS. 5a and 5b. From the geometry of a cube it will be readily appreciated that the triad of cantilever beam members thus mounted to the cubic body has the spatial relationship required by the invention.

If desired, the common support member of metallic material may be omitted. For example, as shown in FIG. 7 three beam members 23x, 23y and 23z such as previously described may be connected together on a bevelled surface 22' of a bolt's head by a mass of any suitable electrically insulating adhesive or bonding agent 37 in such a manner that one side edge of the beam member 23x and the one end edge of the beam member 23z lying on said one side edge, one side edge of beam member 23y and one end edge of the beam member 23x lying on the one side edge of beam member 23x, and one side edge of the beam member 23z and one end edge of the beam member 24y lying on the one edge side of the member 23y extend respectively in three directions orthogonal to each other from a common point at which the abutting corners of the beam members are located. Thus the three beam members are disposed such that three members extend in three directions orthogonal to each other respectively with the main face of each beam perpendicular to the main faces of the other beams. Further the corresponding long edges of the three beams intersect each other at the common point. Of course, each beam member includes one or two piezoresistive elements 24x, 24y or 24z with the associated leads 26 and, if desired, a sensory block 25x, 25y or 25z as in FIG. 4. It will be appreciated that the mass of bonding agent 37 serves as both a common support member and means for mounting the finished device to an object to be measured. This arrangement permits the device to decrease in dimension and weight. For example, such device could be secured on the surface of a bolt's head whose diameter was 15 mm.

Alternatively, a triad of piezoresistive elements themselves may be assembled into a unitary structure in the manner as described for FIG. 7. This is shown in FIG. 8. An arrangement illustrated comprises a triad of composite piezoresistive elements 24x, 24y and 24z such as previously described in conjunction with FIG. 2, in place of three cantilever beam members 23x, 23y and 23z shown in FIG. 7. Other respects are substantially similar as in FIG. 7 except for the absence of sensory block. Therefore, like reference characters designate the part corresponding to those illustrated in FIG. 7. However, the sensory block may be, if desired, attached to each of the piezoresistive elements at the free end as in the previous examples. The arrangement illustrated in FIG. 8 eliminates the necessity of using a cantilever beam member made of a metallic material and is advantageous in that its volume and weight is reduced.

In FIG. 9 there is illustrated a modification of the invention having a unitary structure including a triad of piezoresistive beam members and a common support member prepared from a single body of monocrystalline piezoresistive material such silicon of n type conductivity. An arrangement illustrated comprises a triad of piezoresistive beam members 40x, 40y and 40z extending integrally from a common support member of cubic shape 41 in three orthogonal directions respectively with the main faces of the elements perpendicular to each other. Each of the beam members 40x, 40y and 40z are longitudinally split into a pair of parallel elements 42x and 43x, 42y and 43y or 42z and 43z. Then each pair of piezoresistive beam elements are joined together by any suitable electrically insulating adhesive 44. A pair of leads 45 are connected to each pair of piezoresistive elements and a common lead 46 is connected to the common support member 41.

Preferably, the piezoresistive beam member 40x may take a [100] crystallographic direction of the single crystal used, the member 40y take a [010] crystallographic direction and the member 40z may take a [001]

crystallographic direction in order to render the sensitivities of the respective members substantially equal.

The device illustrated in FIG. 9 can be constructed as follows: A single cubic body of monocrystalline piezoresistive material such as n type silicon, is machined so that it has three elongated cross-section prisms extending in the [100], [010] and [001] crystallographic directions and having a common end portion, with their longitudinal axes intersecting each other a common point. Then each prism is machined into a vibration beam having the opposed main faces substantially normal to those of the other beams, with the three longitudinal axes intersecting at a common point. The vibration beam is split into a pair of parallel elements $42x, y$ or $z$ and $43x, y$ or $z$ and the space between the split elements is filled with any suitable electrically insulating adhesive 44. The device is completed by having leads 45 and 46 connected to the elements and support member.

FIG. 10 shows a further modification of the invention in which a triad of orthogonal cantilever beams and a common support member therefore are prepared into a unitary structure from a single body of monocrystalline semiconductive material with at least one piezoresistive layer subsequently formed on each of the beams. The unitary structure illustrated may be prepared by machining a single body of monocrystalline semiconductive material such as P type silicon such that three orthogonal cantilever beams $50x$, $50y$ and $50z$ extend from a common support member 51 of cubic shape in a [100], a [101] and a [001] crystallographic direction of the raw crystal respectively and include a the main faces perpendicular to each other. The structure just described may be produced in the same manner as described above in conjunction with FIG. 9. It is noted that unlike the device shown in FIG. 9 each beam is not longitudinally split. Then each of the cantilever beams $50x$, $50y$ or $50z$ is provided on both main faces adjacent the fixed end with at least one pair of piezoresistive layers $52x$, $52y$ or $52z$ in this example two pairs symmetrical with respect to the longitudinal axis of the beam and longitudinally thereof. In this example, each beam includes on one main face two pair of piezoresistive layers. To this end, the structure 50–51 may be suitably masked and subject to epitaxial growth or diffusion technique to form the thin layer 52 of n type silicon in the desired positions thereon. Thus the piezoresistive layers are made integral with the associated cantilever beam. In this manner the arrangement can be prepared without the use of any adhesive which may adversely affect the finished device. It is to be noted that, in order to electrically isolate the piezoresistive layers from the associated cantilever beams, the material for the layers should be lower in resistivity than the material for the beam. It has been found that a ratio between the resistivities of the piezoresistive layer and the semiconductor beam bearing the same ranges from 2:1 to 100:1 and preferably from 8:1 to 15:1.

As in the previous embodiments, two pairs of leads 53 are connected to each piezoresistive layer 52.

From the foregoing, it will be readily understood that, when any of the previously described devices other than the device shown in FIG. 3 has been mounted to an object to be measured a point at which one long side or the extension of the longitudinal axis respectively of each cantilever beam or piezoresistive element intersects with those of the other beams or elements is located a distance externally of the object which substantially corresponds to the height of the common support member for the cantilever beams or piezoresistive elements but not on the surface of the object. As previously pointed out, however, this negligible provided that the length of the cantilever beam member or piezoresistive element is small. Notwithstanding the triad of cantilever beams may be effectively mounted on a common mounting such that the extension of the longitudinal axis of each beam intersects with those of the other beams at a point in that surface of the finised device adapted to contact a surface to be measured of an object. To this end, the triad of perpendicular cantilever beam members may be mounted to a common support member in a manner as shown in FIG. 11.

As shown in FIG. 11a, three beam members B such as previously described in conjunction with FIGS. 4, 5a, 5b, 5c, 5d and 5e may be attached to a cubic body of any suitable metallic material whose edge is L in length, in such a manner that the longitudinal axes of the beams coincide with the associated edges intersecting each other at one of the vertex of the cubic body, for example, a vertex O thereof with one long edge of each beam providing an extension of the associated edge of the cubic body. Then secured to the cubic body C with three beams and on the side of the vertex O is a body of the same material having a shape complemental enough to form a right trigonal pyramid TP including, as a vertex, a vertex P̱ of the cubic body C diagonally opposed to the vertex O and including three edges extending from the vertex P̱ and having a length of 3L as shown in FIG. 11b. Thus the vertex O of the cubic body C will be on the base surface of the pyramid TP. Alternatively the three beams B may be planted in the pyramid TP in the manner as previously described in conjunction with FIG. 3. In order to minimize the volume of the pyramid, the same may have a shape as illustrated in FIG. 11c by cutting away its undesired portions. Also the device thus formed may be provided on the base portion with a plurality of mounting holes H.

Various devices similar to those shown in FIGS. 4, 5e and 7 were manufactured including cantilever beam members and piezoresistive elements whose dimensions and materials are listed in Table I.

TABLE I

[Dimensions of and materials for cantilever beam member and piezoresistive element]

| Example No. | Cantilever Beam | | | | Piezoresistive Element | | | |
|---|---|---|---|---|---|---|---|---|
| | Length in mm. | Width in mm. | Thickness in mm. | Material | Length in mm. | Width in mm. | Thickness in mm. | Material |
| 1 | 12 | 3 | 0.3 | Low carbon steel | 3 | 0.3 | 0.07 | N germanium. |
| 3 | 15 | 3.5 | 0.2 | Spring steel | 3.5 | 0.3 | 0.07 | Do. |
| 4 | 5 | 1.4 | 0.15 | ___do___ | 2 | 0.3 | 0.05 | Do. |
| 5 | 4.5 | 1 | 0.1 | ___do___ | 1 | 0.2 | 0.05 | Do. |

Example No. 1 had its construction as illustrated in FIG. 7, Example Nos. 3 and 4 their constructions as illustrated in FIG. 5e, and Example No. 5 had its construction illustrated in FIG. 4. The common mounting or support member 22 shown in FIG. 4 was of a right trigonal pyramid made of a low carbon steel and three base edges each being 16 mm. in length and the three remaining edges each being 4 mm. in length while the support member 22 shown in FIG. 5e was of a cube made of carbon steel and including each edge being 7 mm. in length.

In FIG. 4, the base disk 21 of aluminum was 1 mm. thick and 20 mm. in diameter and the bell jar 28 was a semispherical enclosure having a diameter of 11 mm., a height of 8 mm. and a wall thickness of 0.5 mm.

When Examples No. 1, No. 3, No. 4 and No. 5 included sensory blocks whose masses were 300, 100, 0 and 10 mg. attached at their free ends respectively, they had the resonance frequencies indicated in Table II respectively. Table II also involves volumes occupied by the finished detector units including respective support members for mounting the cantilever beams, and their total weights.

TABLE II

| Example No. | Resonance frequency in cycles per second | Volume occupied in mm.³ | Total Weight in gr. |
|---|---|---|---|
| 1 | 400 | 20 x 20 x 20 | 10 |
| 3 | 500 | 20 x 20 x 20 | 15 |
| 4 | 5,000 | 10 x 10 x 10 | 3 |
| 5 | 2,700 | 0.5 x 10³ | 1.5 |

From Tables I and II it will be appreciated that the invention provides accelerometer devices reduced in both dimension and weight.

A device similar to that shown in FIG. 8 was made including each of piezoresistive beams consisting of a pair of cemented elements made of n type germanium and each having a length of 10 mm., a width of 1 mm. and a thickness of 0.2 mm. This device including no sensory mass had a resonance frequency of approximately 500 cycles per second. With an element of n type silicon having a length of 6 mm., a width of 1 mm. and a thickness of 0.2 mm. the resonance frequency was changed to approximately 5,000 cycles per second.

Various devices similar to those shown in FIGS. 9 and 10 could be prepared having the total weight of the order of 1 gr. with a dimensions less than those listed in Table I.

The results of tests conducted with the device of the invention numbered five in Tables I and II and secured to an electrically operated vibrator machine of the conventional type are shown in FIGS. 12 and 13. In the tested device each of the piezoresistive elements was made of n type germanium having a resistivity of approximately 4.5 ohms-centimeter in the [111] crystallographic direction and had the total resistance measured longitudinally of the same of about 2,000 ohms. An electrical bridge circuit similar to that illustrated in FIG. 6 was used to measure a change in resistance of each of the piezoresistive elements separately subject to a sinusoidal vibration having a variable frequency but a constant amplitude of substantially 1 mm.

In FIG. 12, the abscissa represents a frequency of vibration in cycles per second or an acceleration in values of "$g$," and the ordinate represents an output from the bridge in millivolts per one volt of the voltage across the bridge, per unit value of "$g$." Also, the symbols ⊙, Ⓐ and ⊗ designate measured values for the associated elements, for examples, those in the $x$, $y$ and $z$ directions illustrated in FIG. 4, respectively.

As shown in FIG. 12, the output from the bridge is substantially directly proportional to an acceleration applied to the associated piezoresistive element in the direction normal to the main face thereof within a range of acceleration of from 1 to 12 $g$'s. Also it will be seen that, when each of the three cantilever beams was applied with an acceleration whose magnitude was one of "$g$" of variation in output voltage from the bridge was 0.05 millivolt per one volt of the voltage across the bridge. This magnitude of variation in voltage was proved to be constant over the range of frequency of from 5 to 55 cycles per second or the range of acceleration of from 1 to 12 $g$'s with the amplitude of frequency maintained at substantially 1 mm.

When the device was subject to vibration having a frequency between 10 and 200 cycles per second with an acceleration applied to the device being maintained at a value of 5 $g$'s. The results as shown in FIG. 13 were given. In this case, the electric outputs due to the piezoresistive elements remained substantially unchanged over the range of frequency of from 10 to 200 cycles per second and also had a magnitude of 0.25 millivolt per one volt, the voltage across the bridge per one $g$. as in FIG. 12.

Assuming that the particular piezoresistive element is disposed to have an angle between its longitudinal axis and a given acceleration an electrical bridge associated with that element will provide an output dependent upon the angle. For purpose of simplicity, it is assumed that, as shown in FIG. 14, a direction to vibrate the elements is in the $zx$ plane of a system of three dimensional rectangular coordinates and makes an angle of $\theta$ with respect to the longitudinal axis of a piezoresistive element 24$x$ extending along the $x$ axis. It will be understood that an output due to the element 24$x$ is proportional to sin $\theta$ while an output due to a piezoresistive element 24$y$ extending along the $y$ axis is proportional to cos $\theta$. The remaining element $Ez$ provide, of course, no output.

The results of tests conducted with the case of FIG. 14 are shown in FIG. 15 wherein the abscissa represents the angle between the direction of vibration for one element and the longitudinal axis thereof and the ordinate represents a relative output due to each element. In FIG. 15 two solid curves 1 and 2 designate a sine and a cosine curve with the amplitude being unit, and the symbols ⊙ and Ⓐ designate measured values of the relative outputs due to the elements 24$x$ and 24$y$, respectively.

As shown in FIG. 15 the measured values of the relative output are substantially on the respective solid curves and it has been determined that any deviation of the measured output from the sine or cosine curve is less than ±4 degrees in terms of angle.

When the tested device was subject to vibration in the direction normal to the main face of a piezoelectric element #1 and parallel to the main faces of piezoelectric elements #2 and #3 outputs due to the latter two elements relative to an output due to the element #1 are shown by the symbols Ⓐ and ⊙ in FIG. 16 respectively with a magnitude of an applied acceleration varied from 1 to 12 $g$'s. The results shown in FIG. 16 indicate that even the maximum magnitude of relative output due to either of the elements having their main face in the direction of vibration approximately $-20$ $dl$.

It has been found that the deviation of angle and relative output described respectively in conjunction with FIGS. 15 and 16 can be reduced by more accurately disposing three piezoresistive elements in perpendicular relationship and improving the behavior of a common support member therefor.

The invention has several advantages. For example, the present accelerometer device has, in addition to its simple construction, a minimum effect upon an object to be detected to which the device is mounted, because the device can be extremely small in size and very light in weight as indicated in Tables I and II. The resultant of three components of an acceleration measured by the device provides an acceleration at a point where the same is secured, if the piezoresistive elements or the cantilever beams bearing the same is small in lengh. This decrease in length is always possible. As a single device of the invention can determine three unknown quantities a motion of an object can readily be determined by merely mounting two detector devices on the object at different points to determine six unknown quantities at any instant.

While the invention has been described with respect to certain preferred embodiments thereof it is to be understood that numerous variations in the detail of construction, the arrangement and combination of parts and the type of materials used without departing from the spirit and scope of the invention.

What we claim is:

1. A three-dimensional accelerometer device for measuring acceleration at a point on an object comprising a common support member, three thin, small elongated rectangular piezoresistive transducer elements extending respectively in three directions orthogonal to each other and secured at one end to said common support member to form a unitary structure with the main faces of said elements perpendicular to each other and with three elongated axes extending through said elements parallel to the longitudinal central axes thereof at positions lying no farther from the longitudinal central axes thereof than the longitudinal edge surfaces of said elements, said elongated axes intersecting each other substantially at a common point adjacent the fixed ends of the elements, each of said piezoresistive elements being essentially responsive to a component of an acceleration applied to the device in a direction normal to the main face of the element to change an electrical resistance of the same in proportion to the magnitude of said component of the acceleration, and a set of electrical leads connected to each of said piezoresistive elements, said common support member serving to mount the device to an object to be measured with said common point adjacent the point at which acceleration is to be measured.

2. A three-dimensional accelerometer device as claimed in claim 1 in which said elongated axes are coincident with the longitudinal central axes of said elements.

3. A three-dimensional accelerometer device as claimed in claim 1, wherein said common support member is a right trigonal pyramid having three side planes which are right isosceles, triangular in shape and having a bottom plane which has a regular triangular shape, and each of said elements is secured at one end to each of said side planes of the pyramid perpendicularly thereto and at the center of gravity of the side plane with the main face of the element parallel to one of a pair of adjacent edges of the pyramid defining said one side plane, and said elongated axes being the longitudinal axes of said elements and intersecting each other at the center of said bottom plane of the pyramid.

4. A three-dimensional accelerometer device as claimed in claim 1, in which said elongated axes lie on one longitudinal edge surface of said elements, said longitudinal edge surfaces intersecting each other at said common point on the surface of said common support member.

5. A three-dimensional accelerometer device as claimed in claim 4, wherein said common support member is in the form of a right trigonal pyramid having three side planes which are right isosceles, triangular in shape and having a bottom plane which has a regular triangular shape, and each of said elements is disposed on a vertex portion of said pyramid to form a unitary structure with each of said elements having one main face which is coplanar with and is an extension of the associated side plane of the pyramid and having one longer edge which is an extension of the one of three edges of the associated side planes intersecting at said vertex portion of the pyramid.

6. A three-dimensional accelerometer device as claimed in claim 1, wherein said common support member is in the form of a cube, and each of said elements is disposed on one vertex portion of said cube to form a unitary structure with each of said elements having one main face which is coplanar with and is an extension of the associated square face of the cube and having one longer edge which is an extension of one of three edges of associated square intersecting at said one corner portion of the cube.

7. A three-dimensional accelerometer device as claimed in claim 1, in which said common support member is a cube, and said transducer elements project perpendicularly from three adjacent faces of the cube respectively and the said elongated axes being the central longitudinal axes of said elements and intersecting each other at the center of the cube, said common support member and said three transducer elements being a monolithic single body of monocrystalline piezoresistive material, said three transducer elements extending in the [100], [010] and [001] crystallographic directions respectively, each of said transducer elements having a central notch extending throughout the width and length thereof to divide the element into two spaced opposed pieces, a layer of electrically insulating bonding material filling said notch in each of said transducer elements and bonding said two opposed pieces together, a pair of electrical leads connected to the free ends of two opposed piezoresistive pieces forming said transducer element, and an electric conductor connected to said common support member.

8. A three-dimensional accelerometer device as claimed in claim 1, in which said common support member is a cube, and said transducer elements being rectangular beam members projecting perpendicularly from three adjacent faces of the cube respectively and the said elongated axes being the central longitudinal axes of said beam members intersecting each other at the center of the cube, said common support member and said three beam members being a monolithic single body of monocrystalline piezoresistive material, said three beam members extending in the [100], [010] and [001] crystallographic directions respectively, at least one pair of piezoresistive layers longitudinally deposited on each of the opposed main faces of each of said beam members adjacent the fixed end and in opposed relationship and symmetrical with respect to the longitudinal axis of the beam member, said piezoresistive material layer being a piezoresistive material lower in resistivity than the beam members, and one pair of electrical leads connected to each of said piezoresistive layer at both ends.

References Cited by the Examiner

UNITED STATES PATENTS

| 2,231,957 | 2/1941 | Shrader | 73—71.1 |
| 2,906,117 | 9/1959 | Kennard | 73—70.2 |
| 2,939,317 | 6/1960 | Mason. | |
| 2,963,911 | 12/1960 | Courtney-Pratt et al. | 73—517 |
| 3,034,345 | 5/1962 | Mason | 73—741 |
| 3,049,685 | 8/1962 | Wright. | |

OTHER REFERENCES

An article entitled "Semiconductor Strain Gages" by Sanchez et al. from Instrument Society of America Journal, volume 9, No. 5, May 1962, pages pages 38–40.

An article from the "6th Annual Report, N.A.C.A.," 1920, pages 491–504, "Report No. 100" by Norton et al., pages 493, 500 and 501.

RICHARD C. QUEISSER, *Primary Examiner.*

JAMES J. GILL, *Assistant Examiner.*